Patented Oct. 4, 1949

2,483,415

UNITED STATES PATENT OFFICE 2,483,415

METHOD OF PREPARING SUBSTITUTED AMMONIUM THIOCYANATES

William H. Hill, Pittsburgh, Pa., assignor to Koppers Company, Inc., Pittsburgh, Pa., a corporation of Delaware No Drawing. Application July 11, 1945, Serial No. 604,495

17 Claims. (Cl. 260—553)

This invention relates the chemical methods and is directed particularly to the manufacture of substituted ammonium thiocyanates.

The organic ammonium thiocyanates may be prepared by the double decomposition of suitable organic ammonium salts with suitable inorganic thiocyanates. For example, dicyandiamidine sulphate will react with barium thiocyanate in aqueous solution to give dicyandiamidine thiocyanate and barium sulphate. The barium sulphate may be filtered off and the dicyandiamidine thiocyanate recovered from the filtrate by evaporation and crystallization. This process is inconvenient, tedious and costly. It is not suitable where ammonium thiocyanate is available as a raw material because of the solubility of the product ammonium sulphate. While it is possible to react ammonium thiocyanate directly with a free base, the method is not suitable where thermally unstable bases, such as dicyandiamidine, are involved.

It is an object of the present invention to provide a simple and effective method of preparing substituted ammonium thiocyanates from ammonium thiocyanate. It is a further object of the invention to provide a method which is particularly adapted to preparing substituted ammonium thiocyanates from thermally unstable basic amino compounds. It is a further object of the invention to avoid the disadvantages of the prior art and to obtain advantages as will appear hereinafter. Further objects will become apparent as the description proceeds.

These objects are accomplished in the present invention by acting upon certain nitrogen compounds with ammonium thiocyanate in a menstruum consisting essentially of liquid ammonia.

The nitrogen compounds useful in the process of the invention are basic amino compounds. By this term I mean those organic nitrogen compounds which have the capacity to form salts with acids. Such nitrogen compounds according to the invention react with ammonium thiocyanate in liquid ammonia to give the corresponding substituted ammonium thiocyanate.

More particularly, the objects of the invention are accomplished, especially where the free basic amino compound is thermally unstable, by freeing the basic amino compounds in situ in the menstruum by incorporating therein a salt of a basic amino compound with a polybasic acid. These salts, which more properly may be designated as substituted ammonium salts of polybasic acids, react with ammonium thiocyanate in the menstruum to give the corresponding substituted ammonium thiocyanate and to precipitate the anion of the salt as ammonium salt of the polybasic acid. Inasmuch as these ammonium salts are completely insoluble in liquid ammonia, the desired substituted ammonium thiocyanate may easily by recovered free of contamination by filtering off or otherwise separating the precipitated ammonium salt and evaporating the liquid ammonia.

My invention may be more fully understood by reference to the following example in which the parts are by weight unless otherwise specified. To a solution of 30 parts of ammonium thiocyanate and 200 parts of liquid ammonia there was added in small portions with stirring 60 parts of dicyandiamidine sulphate. Insoluble ammonium sulphate was filtered off and washed with fresh portion of liquid ammonia. The ammonia in the filtrate was allowed to evaporate leaving 58.4 parts of a white solid residue analyzing 37.0% thiocyanate (SCN) and 42.3% nitrogen. These figures are very close to the theoretical figures for dicyandiamidine thiocyanate which are 36% thiocyanate (SCN) and 43.5% nitrogen.

While I have disclosed my invention with reference to a particular embodiment thereof, it will be understood that variations may be made therein without departing from the spirit and scope of the invention as long as a basic amino compound or more preferably a substituted ammonium salt of a polybasic acid is acted upon with ammonium thiocyanate in a menstruum consisting essentially of liquid ammonia.

The proportions of ammonium thiocyanate to basic amino compound may be varied but for practical purposes should be maintained as closely as possible to the stoichiometric (equimolecular proportions). Excesses of either reagent appear undesirable and unnecessarily complicate the isolation of the product.

The amount of liquid ammonia is not critical but may be varied widely within the limits of economy on the one hand and an easily workable menstruum on the other hand. The quantity should be sufficient to accommodate the precipitated ammonium salt without unnecessarily thickening the menstruum and should be sufficient to hold substantially all of the substituted ammonium thiocyanate in solution. Those skilled in the art having reference to the example given above will be readily able to determine suitable amounts.

The liquid ammonia is preferably anhydrous but nevertheless may contain a substantial amount of water. Liquid ammonia which contains up to as much as 40% water functions essentially as liquid ammonia in contradistinction to aqueous ammonia. Hence where a wet product or drying the product are not objectionable, the liquid ammonia may contain up to about 40% water.

The temperature will ordinarily be that of liquid ammonia at atmospheric pressure. A lower temperature may be used but is not generally practical. Also a higher temperature may be used if the reaction is to be carried out in a pressure vessel but this too will not ordinarily be desirable.

In place of dicyandiamidine sulphate, there may be substituted dicyandiamidine salts of other polybasic acids such as phosphoric, phthalic and maleic acids.

While the invention is particularly applicable to making the thiocyanate of dicyandiamidine because of the thermal instability of this basic amino compound, it is broadly applicable to making substituted ammonium thiocyanates generally from any basic amino compound or organic nitrogenous bases which is soluble in liquid ammonia and which, if a salt is used, may be set free from the salt in the liquid ammonia menstruum. Thus by substituting suitable basic amino compounds or suitable substituted ammonium salts of polybasic acids, the processes of the invention may be utilized for making a wide variety of substituted ammonium thiocyanates such, for example, as the thiocyanates of mono, di- and trithanolamine, ethyl amine, dimethyl amine, trimethyl amine, propyl amine, dioctyl amine, ethylene diamine, triethylene tetramine, trimethylene diamine, aniline, ethyl aniline, dimethyl aniline, p-tert butyl aniline, toluidine, benzyl amine, phenylhydrazine, o-phenylene diamine, alpha and beta naphthylamine, pyridine, quinoline, alpha, beta and gamma picoline, quinaldine, nicotine and brucine. Where a salt is used, especially a salt of a particularly strong base, such as guanidine, it may be expedient to include in the menstruum an equivalent of sodium or potassium amide in order to insure that the base is freed in situ in the menstruum. The sodium and potassium salts of polybasic acids are insoluble in liquid ammonia and thus do not complicate the process.

I claim:

1. In the process for making substituted ammonium thiocyanates by means of the reaction of a basic amino compound and ammonium thiocyanate, the improvement which comprises acting upon a basic amino compound with ammonium thiocyanate in a menstruum consisting essentially of liquid ammonia and isolating the substituted ammonium thiocyanate.

2. The process of claim 1 in which the basic amino compound is introduced in the form of its salt with a polybasic acid.

3. The process of claim 2 in which the polybasic acid is sulfuric acid.

4. The process of claim 2 in which the menstruum contains an amount of alkali metal amide substantially equivalent to the basic amino compound.

5. The process of claim 2 in which the menstruum is anhydrous liquid ammonia.

6. The process of claim 1 in which the menstruum is anhydrous liquid ammonia.

7. In the manufacture of dicyandiamidine thiocyanate the steps of acting upon a dicyandiamidine salt of a polybasic acid with ammonium thiocyanate in a menstruum consisting essentially of liquid ammonia, separating ammonium salt of said polybasic acid from menstruum and isolating dicyandiamidine thiocyanate from the remainder.

8. In the manufacture of dicyandiamidine thiocyanate the steps of acting upon a dicyandiamidine sulphate with ammonium thiocyanate in a menstruum consisting essentially of liquid ammonia, separating ammonium sulphate from the said menstruum and isolating dicyandiamidine thiocyanate from the remainder.

9. In the manufacture of dicyandiamidine thiocyanate the steps of acting upon a dicyandiamidine salt of a polybasic acid with ammonium thiocyanate in anhydrous liquid ammonia, separating ammonium salt of said polybasic acid from menstruum and isolating dicyandiamidine thiocyanate from the remainder.

10. In the manufacture of dicyandiamidine thiocyanate the steps of acting upon a dicyandiamidine sulphate with ammonium thiocyanate in anhydrous liquid ammonia, separating ammonium sulphate from the said menstruum and isolating dicyandiamidine thiocyanate from the remainder.

11. In the process for making organic thiocyanates by means of the reaction of a basic organic amino compound and ammonium thiocyanate, the improvement which comprises acting upon a basic organic amino compound with ammonium thiocyanate in a menstruum consisting essentially of liquid ammonia.

12. In the process for making organic thiocyanates by means of the reaction of a basic organic amino compound and ammonium thiocyanate, the improvement which comprises acting upon a salt of a basic organic amino compound and a polybasic acid with ammonium thiocyanate in a menstruum consisting essentially of liquid ammonia.

13. In the process for making organic thiocyanates by means of the reaction of a basic organic amino compound and ammonium thiocyanate, the improvement which comprises acting upon a salt of a basic organic amino compound and sulphuric acid with ammonium thiocyanate in a menstruum consisting essentially of liquid ammonia.

14. The method which comprises acting upon dicyandiamidine salt of a polybasic acid with ammonium thiocyanate in a menstruum consisting essentially of liquid ammonia.

15. The method which comprises acting upon a dicyandiamidine sulphate with ammonium thiocyanate in a menstruum consisting essentially of liquid ammonia.

16. The process which comprises acting upon a dicyandiamidine salt of a polybasic acid with ammonium thiocyanate in anhydrous liquid ammonia.

17. The process which comprises acting upon a dicyandiamidine sulphate with ammonium thiocyanate in anhydrous liquid ammonia.

WILLIAM H. HILL.

REFERENCES CITED

The following references are of record in the file of this patent:

UNITED STATES PATENTS

| Number | Name | Date |
|---|---|---|
| 1,902,400 | Gluud | Mar. 21, 1933 |
| 2,274,412 | Hill | Feb. 24, 1942 |

FOREIGN PATENTS

| Number | Country | Date |
|---|---|---|
| 620,509 | Germany | Feb. 25, 1937 |